US011211822B2

(12) United States Patent
Yamamoto et al.

(10) Patent No.: US 11,211,822 B2
(45) Date of Patent: Dec. 28, 2021

(54) POWER SUPPLY DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Yasuyuki Yamamoto, Mie (JP); Takeshi Uraki, Mie (JP); Kota Oda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/757,271

(22) PCT Filed: Jun. 28, 2018

(86) PCT No.: PCT/JP2018/024502
§ 371 (c)(1),
(2) Date: Apr. 17, 2020

(87) PCT Pub. No.: WO2019/082444
PCT Pub. Date: May 2, 2019

(65) Prior Publication Data
US 2021/0194286 A1   Jun. 24, 2021

(30) Foreign Application Priority Data
Oct. 26, 2017   (JP) .............................. JP2017-206901

(51) Int. Cl.
*H02J 50/12*   (2016.01)
*H02J 50/40*   (2016.01)
(Continued)

(52) U.S. Cl.
CPC ............... *H02J 50/12* (2016.02); *B60N 2/06* (2013.01); *B60N 2/14* (2013.01); *B60N 2/90* (2018.02);
(Continued)

(58) Field of Classification Search
CPC .. H02J 50/12; H02J 50/50; H02J 50/40; H02J 50/90; B60N 2/12; B60N 2/10;
(Continued)

(56) References Cited

U.S. PATENT DOCUMENTS 10,085,562 B1 * 10/2018 Labrosse ................ A47C 7/727
10,827,829 B1 * 11/2020 Labrosse ................ A47B 9/20
(Continued)

FOREIGN PATENT DOCUMENTS

JP   2009-292230 A   12/2009
JP   2014-236540 A   12/2014
(Continued)

OTHER PUBLICATIONS

International Search Report dated Aug. 7, 2018 for WO 2019/082444 A1.

*Primary Examiner* — Daniel Kessie
*Assistant Examiner* — Brian K Baxter
(74) *Attorney, Agent, or Firm* — Abelman, Frayne & Schwab

(57) ABSTRACT

A power supply device (10) for a seat that can slidably move relative to a rail (15) that is provided in the floor portion (11) of an automotive body, the power supply device (10) including: the power transmission unit (20) that is provided in the floor portion (11); the rotation shaft portion (40) that is fixed
(Continued)

to the seat, and serves as the rotation axis of the seat; and the power reception unit (30) that is fixed to the rotation shaft portion (40) and is configured to receive power from the power transmission unit (20).

8 Claims, 14 Drawing Sheets

(51) Int. Cl.
| | |
|---|---|
| *B60N 2/90* | (2018.01) |
| *B60N 2/06* | (2006.01) |
| *B60N 2/14* | (2006.01) |
| *B60R 16/03* | (2006.01) |
| *H02J 50/90* | (2016.01) |

(52) U.S. Cl.
CPC .............. *B60R 16/03* (2013.01); *H02J 50/40* (2016.02); *H02J 50/90* (2016.02)

(58) Field of Classification Search
CPC . B60N 2/269; B60N 2/06; B60N 2/90; B60N 2/14; B60R 16/03
See application file for complete search history.

(56) References Cited

U.S. PATENT DOCUMENTS

| | | | |
|---|---|---|---|
| 2016/0244186 A1* | 8/2016 | Brown | ...................... B64C 1/20 |
| 2018/0115131 A1* | 4/2018 | Kohen | ............... H01R 13/7038 |
| 2019/0260238 A1* | 8/2019 | Cho | ..................... B60N 2/5685 |
| 2020/0251930 A1* | 8/2020 | Yamamoto | ............... B60N 2/90 |

FOREIGN PATENT DOCUMENTS

| | | |
|---|---|---|
| JP | 2015-110352 A | 6/2015 |
| JP | 2015-134513 A | 7/2015 |

* cited by examiner

POWER SUPPLY DEVICE

CROSS REFERENCE TO RELATED APPLICATIONS

This application is a national phase of PCT application No. PCT/JP2018/024502, filed on 28 Jun. 2018, which claims priority from Japanese patent application No. 2017-206901, filed on 26 Oct. 2017, all of which are incorporated herein by reference.

TECHNICAL FIELD

The present specification discloses a technique to supply power to a slidable seat.

BACKGROUND

Techniques to contactlessly supply power to slidable seats in automobiles are currently known. The power supply mechanism for sliding seats in Patent Document 1 includes a power reception unit provided with a plurality of power reception coils, and a power supply unit that includes a power supply coil in the floor of the body of an automobile that contactlessly supplies power to the power reception coils. The power reception coils that are provided in a plurality of locations in the sliding seat are thus contactlessly supplied with power from the power supply coil.

PRIOR ART DOCUMENT

Patent Document

Patent Document 1: JP 2015-134513A

SUMMARY OF THE INVENTION

Problems to be Solved

It is assumed that the seats of automobiles will have higher levels of functionality as automobiles become autonomous, and it is also assumed that seats will need to not only slide relative to the bodies of the automobiles, but will also need to be able to rotate relative to the bodies of the automobiles in order for passengers to get in and out of the automobile. If the sliding seat disclosed in Patent Document 1 could rotate, there is concern that the seat would move to a position in which power cannot be supplied from the power supply coil to the plurality of power reception coils because it is configured such that power is supplied from one power supply coil to a plurality of power reception coils in the sliding seat, therefore making it difficult to supply power from the power supply unit to the power reception unit of the sliding seat.

The technique disclosed in the present specification was completed based on the circumstances described above, and an object thereof is to provide a power supply device with which it is possible to continue to supply power from a power transmission unit to a power reception unit when a seat rotates.

Means to Solve the Problem

A power supply device according to the present specification is a power supply device for a seat that can slidably move relative to a rail that is provided in a floor portion of an automotive body, the power supply device including: a power transmission unit that is provided in the floor portion; a rotation shaft portion that is fixed to the seat, and serves as the rotation axis of the seat; and a power reception unit that is fixed to the rotation shaft portion and is configured to receive power from the power transmission unit.

With this configuration, the power reception unit is fixed to the rotation shaft portion that serves as the rotation axis of the seat, and therefore it is possible to hold the power reception unit at a position at which power can be supplied from the power transmission unit, even if the seat is rotated. Accordingly, it is possible to continue to supply power from the power transmission unit to the power reception unit when the seat is rotated.

The following modes are preferable as embodiments of the technique disclosed in the present specification.

The power transmission unit includes a power transmission coil, and the power reception unit includes a power reception coil that receives power from the power transmission coil.

The power transmission unit includes a plurality of the power transmission coils, and the plurality of power transmission coils are arranged next to each other along the sliding direction of the seat in the floor portion.

In this way, the power transmission coil that transmits power to the power reception coil can be changed in accordance with the sliding of the seat.

The center of the power reception coil and the center of the rotation shaft portion are arranged coaxially.

In this way, if the seat is rotated in a state in which the power reception coil is at a position at which the power reception coil can receive power from the power transmission coil, it is possible to suppress positional misalignment of the power reception coil relative to the power transmission coil, and therefore it becomes possible to more reliably continue to supply power from the power transmission unit to the power reception unit.

A metal shield cover is included that is configured to cover the power transmission unit and the power reception unit, and an insertion hole into which the rotation shaft portion is inserted is formed passing through the shield cover.

In this way, it is possible to reduce electro-magnetic noise from the power transmission coil and the power reception coil due to the shield cover.

The shield cover includes a leg portion that is slidably inserted into the rail.

In this way, it is possible to hold the shield cover with the leg portion.

Effect of the Invention

With the technique disclosed in the present specification, it is possible to continue to supply power from the power transmission unit to the power reception unit when the seat is rotated.

DETAILED DESCRIPTION TO EXECUTE THE INVENTION

First Embodiment

A first embodiment will be described with reference to FIGS. 1 to 14.

A power supply device 10 of the present embodiment may be installed in a vehicle such as an automobile to supply power to an electrical component or the like installed in a seat 60. The following description makes reference to the three directions indicated in FIG. 1, with the X direction being forward, the Y direction being leftward, and the Z direction being upward.

Figure 1:
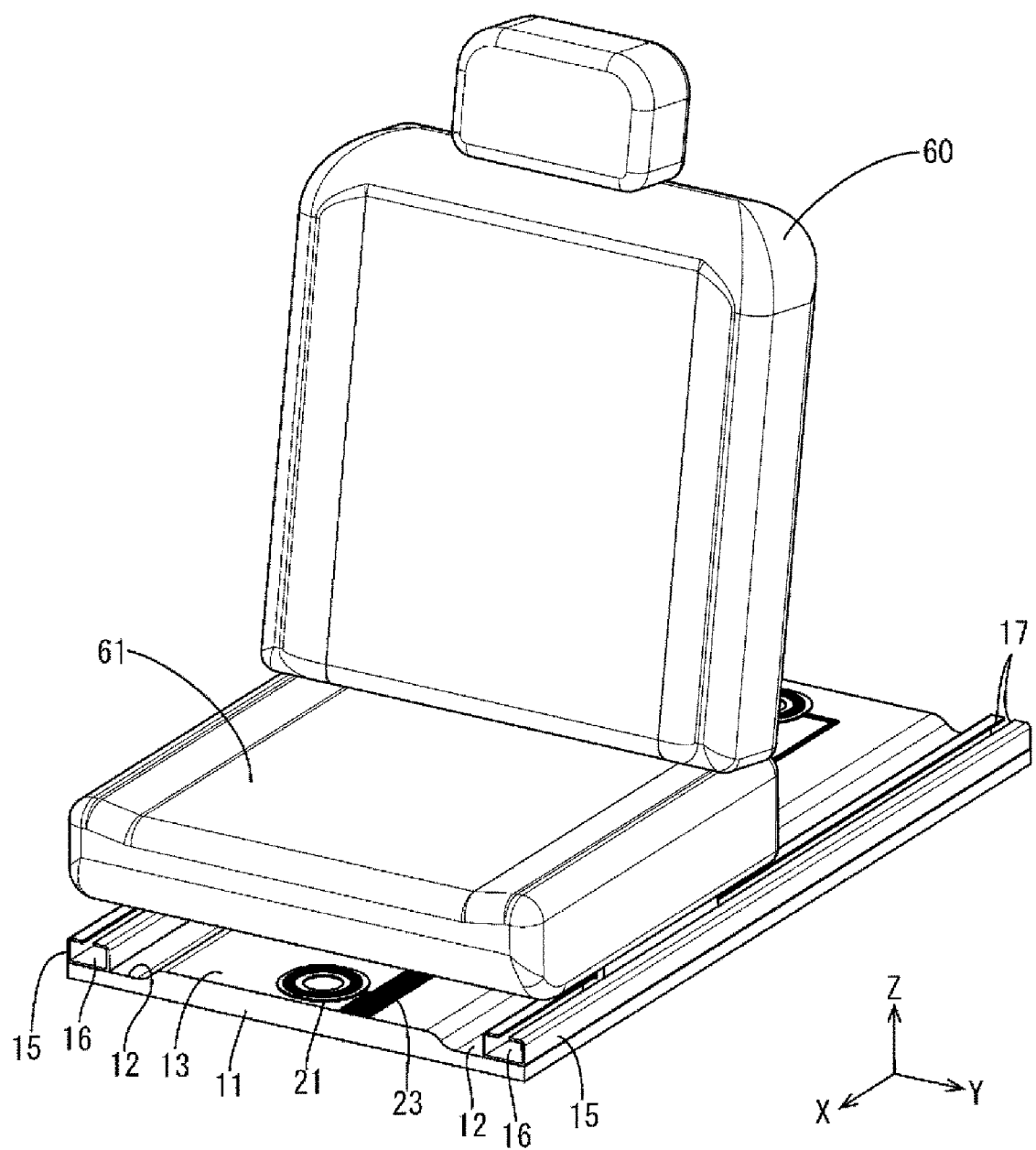
FIG. 1 is a perspective view showing a seat that includes a power supply device of a first embodiment.
Figure 2:
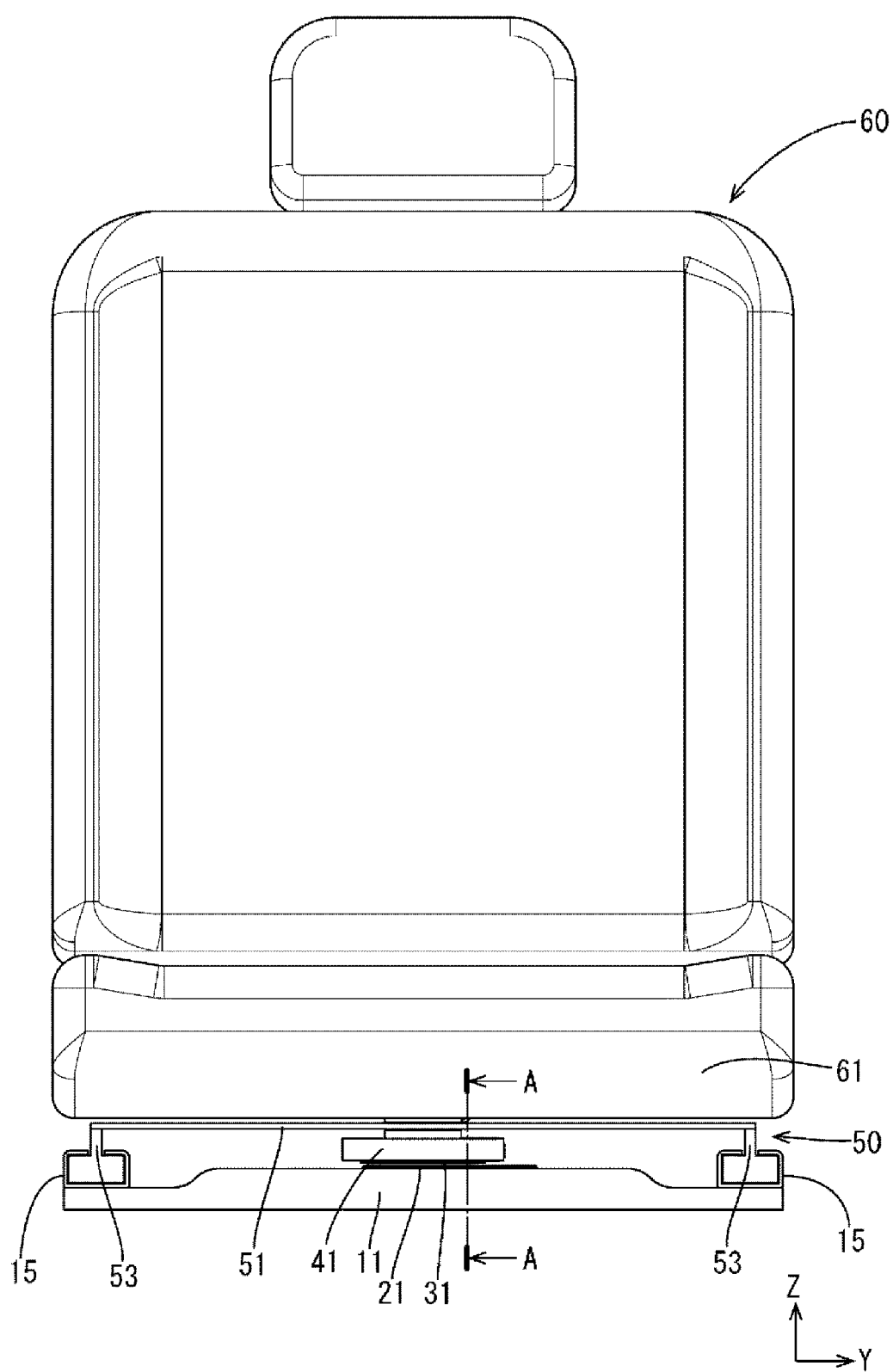
FIG. 2 is a front view showing the seat that includes the power supply device.

As shown in FIG. 1, the vehicle includes a pair of rails 15 fixed on a floor portion 11 (only a portion of which is shown in FIG. 1) of the passenger compartment of an automotive body, and the seat 60 can slide back and forth on the pair of rails 15. A pair of recessed portions 12 are formed sinking into the upper surface of the floor portion 11 at the positions of the rails 15, and the portion of the floor portion 11 between the pair of recessed portions 12 is a protruding portion 13 that is slightly higher than the pair of recessed portions 12. Vehicles include a plurality of the seats 60, and all or some of the plurality of seats 60 may include various types of electrical components such as an electric reclining device, a seat heater, a display such as a touch panel, an air conditioner, a sensor that detects whether or not a passenger is sitting on the seat, or a sensor that detects whether or not a passenger is wearing their seatbelt. The various types of electrical components are supplied with power from the power supply device 10 under the seat 60, which will be described later.

Each of the rails 15 is made of a metal such as steel or aluminum, each has a rectangular tube shape, each includes a rectangular through-hole 16 that passes in the longitudinal direction, each extends in a straight line, and the upper portion of each of the rails 15 includes a slit-shaped through-groove 17 that passes through the entire length of the rail 15 in the longitudinal direction thereof and is in communication with the through-hole 16.

(Power Supply Device 10)

Figure 3:
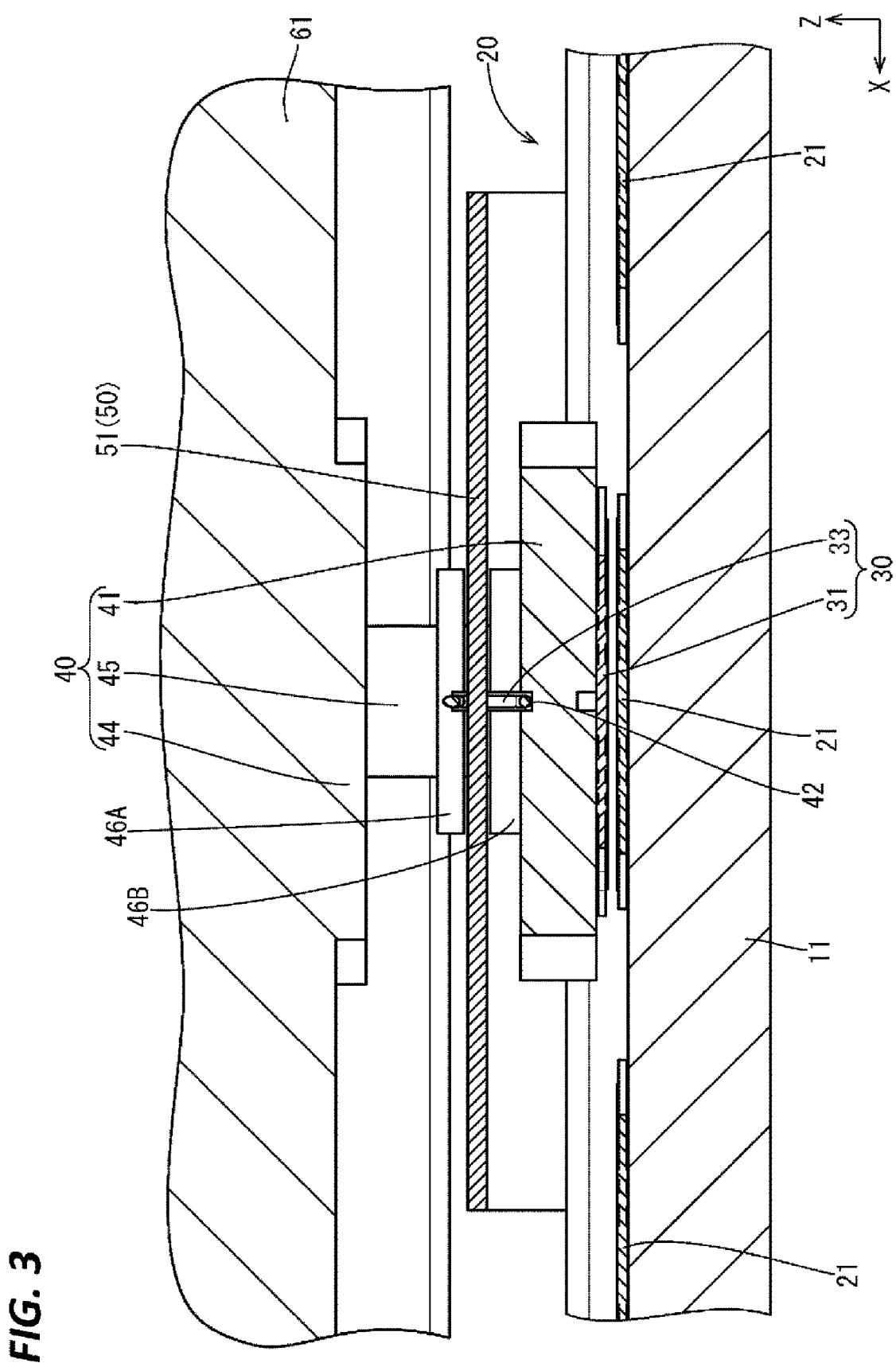
FIG. 3 is a cross-sectional view taken along the line A-A in FIG. 2.
Figure 4:
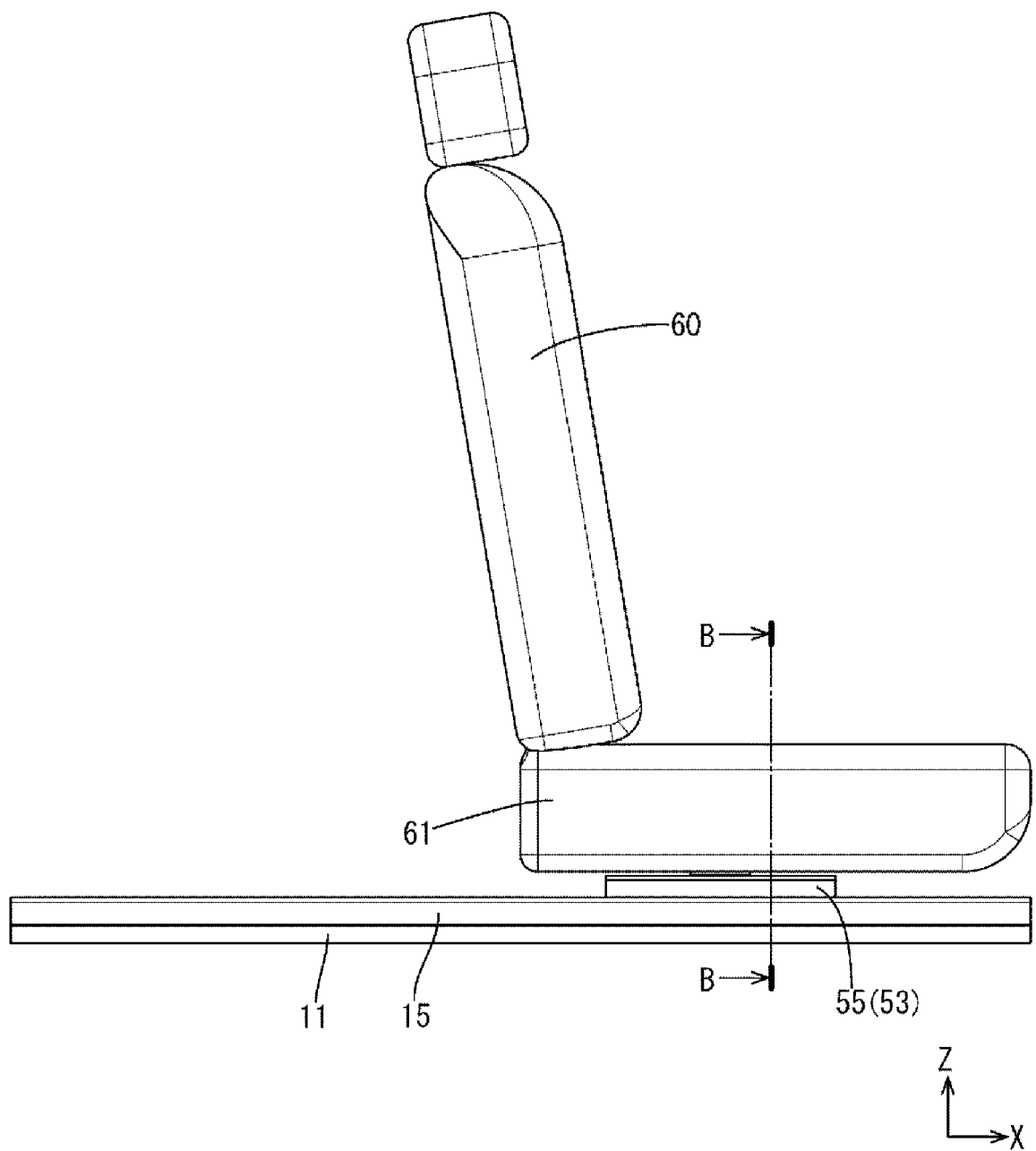
FIG. 4 is a right-side view showing the seat that includes the power supply device.
Figure 5:
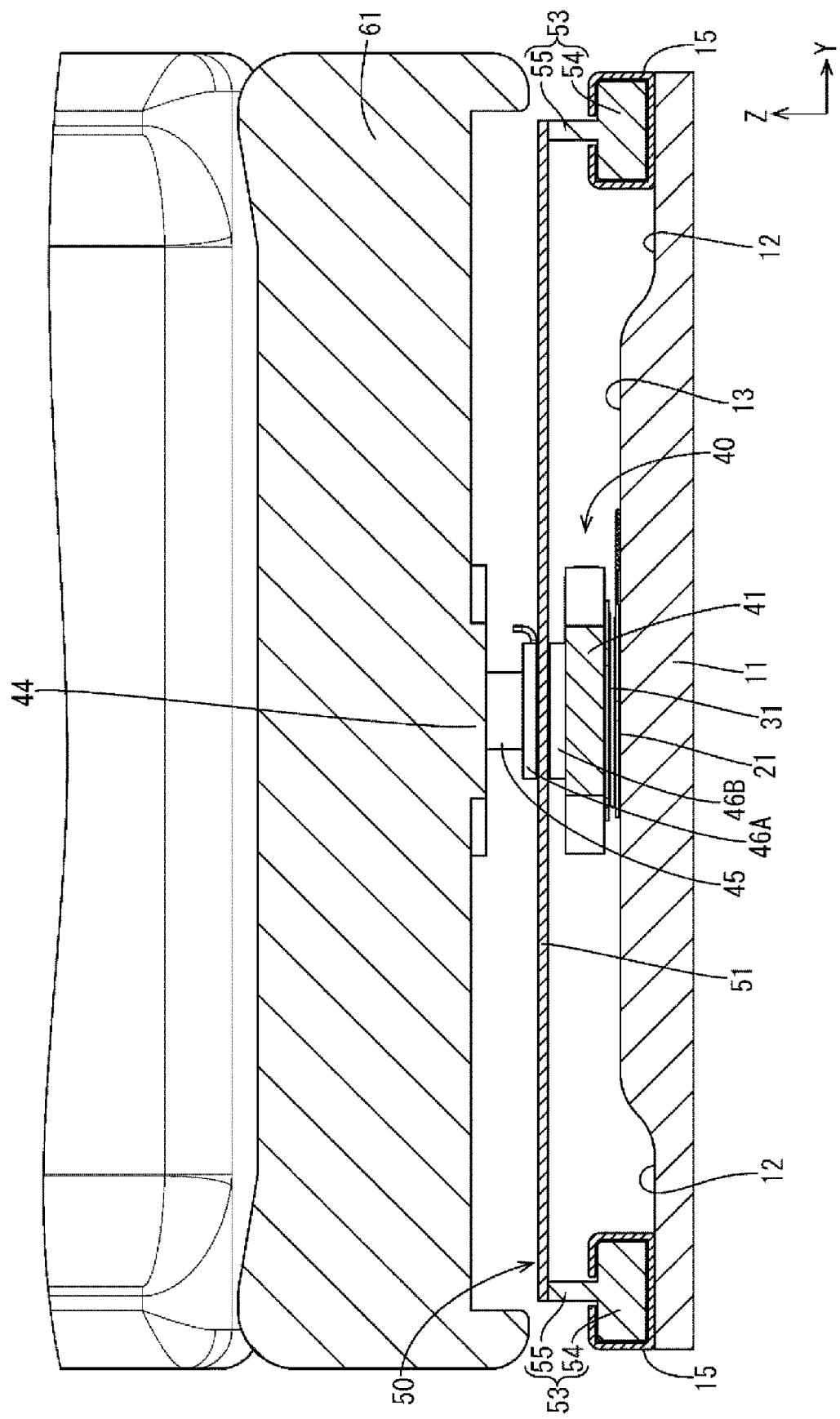
FIG. 5 is a cross-sectional view taken along the line B-B in FIG. 4.

As shown in FIG. 3, the power supply device 10 includes a power transmission unit 20 that includes a plurality of power transmission coils 21 and is provided in the floor portion 11 of the automotive body, a power reception unit 30 that includes one power reception coil 31, which receives power from the power transmission coils 21, and that is provided below a sitting portion 61 of the seat 60, a rotation shaft portion 40 that couples the seat 60 and the power reception unit 30 and has the power reception coil 31 fixed to the bottom surface thereof, and a shield cover 50 that is made of a metal and covers the power transmission coils 21 and the power reception coil 31.

(Power Transmission Unit 20)

Figure 7:
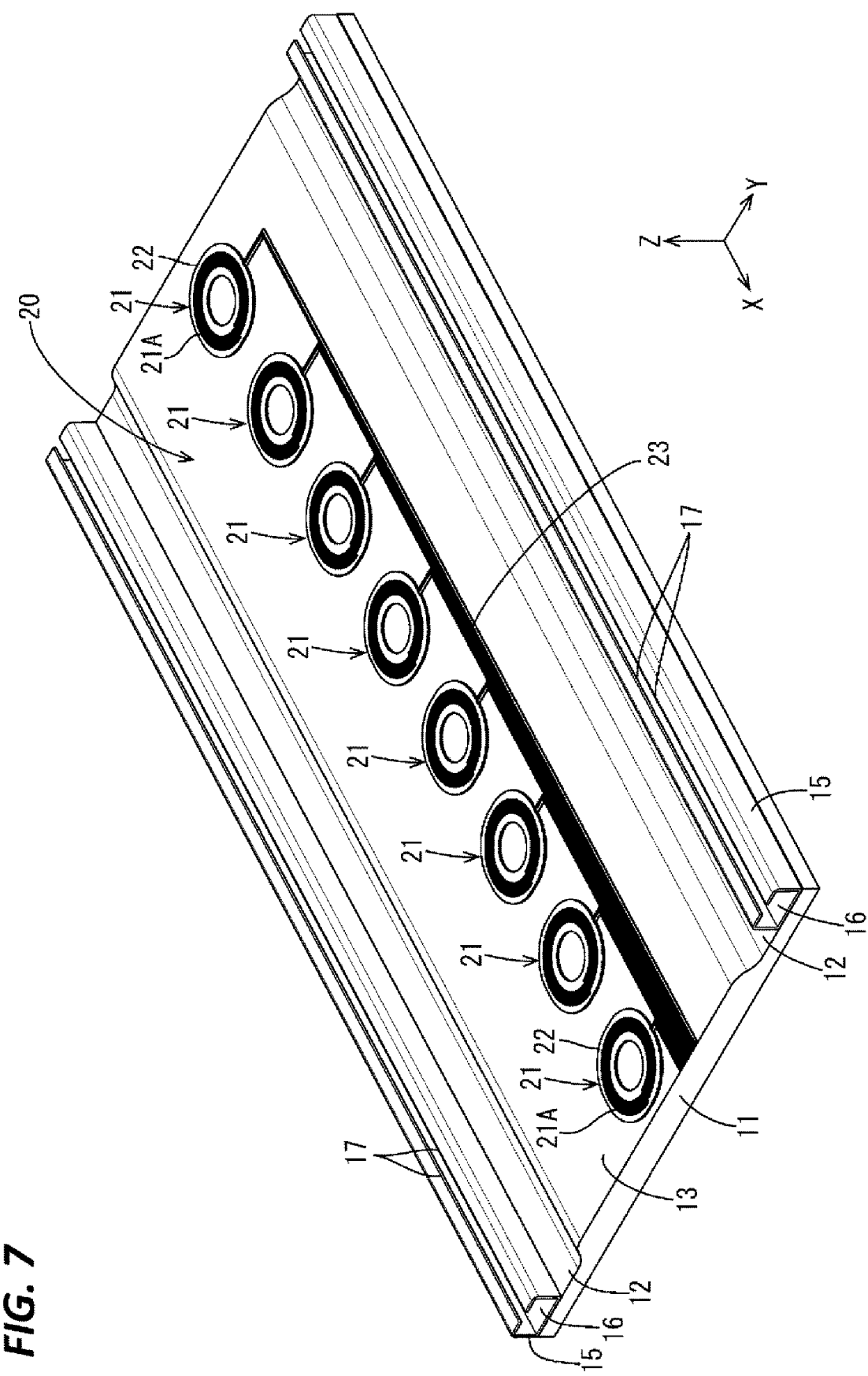
FIG. 7 is a perspective view showing rails and power transmission units attached to the floor portion of an automotive body.
Figure 8:
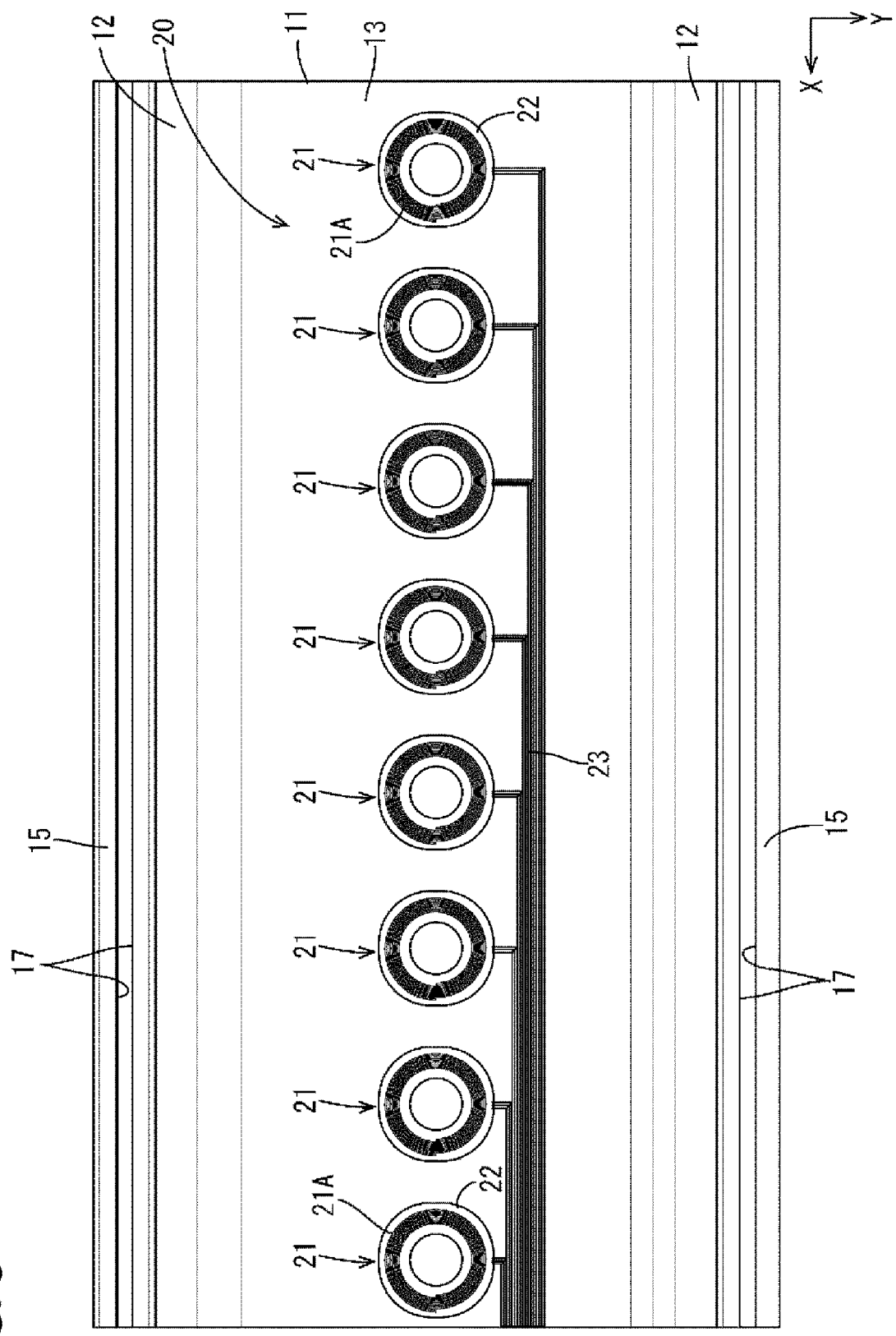
FIG. 8 is a plan view showing the rails and the power transmission units attached to the floor portion of the automotive body.
Figure 9:
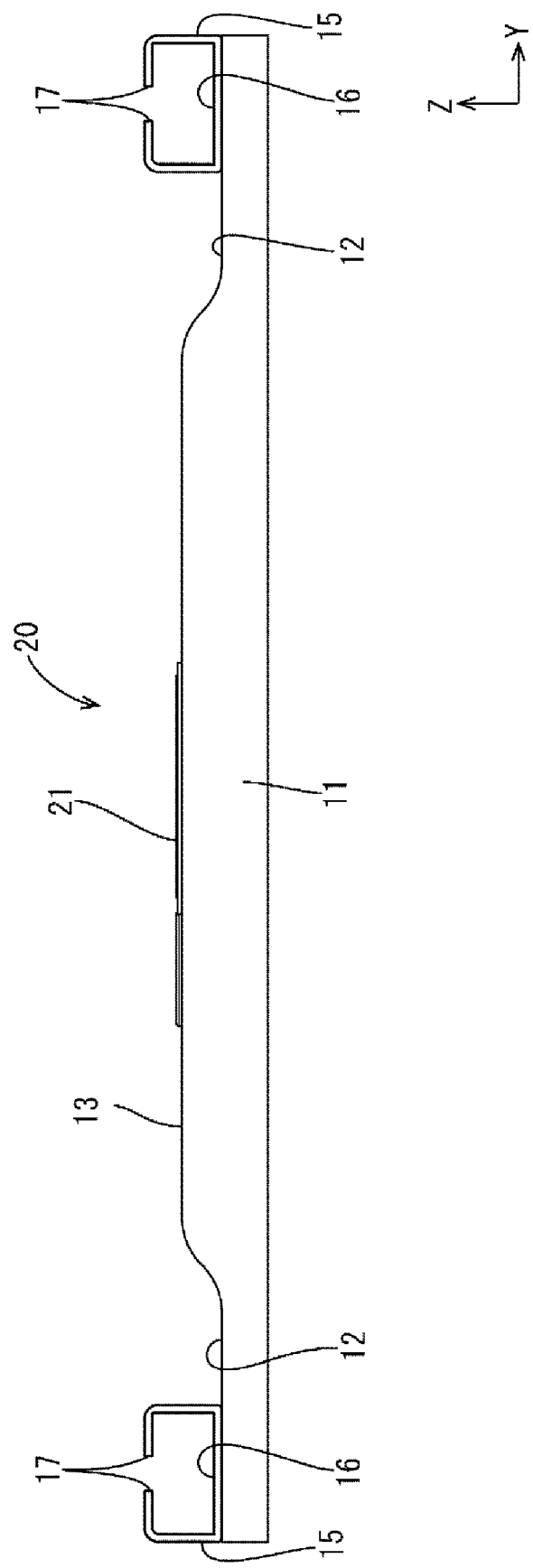
FIG. 9 is a front view showing the rails and the power transmission units attached to the floor portion of the automotive body.
Figure 10:
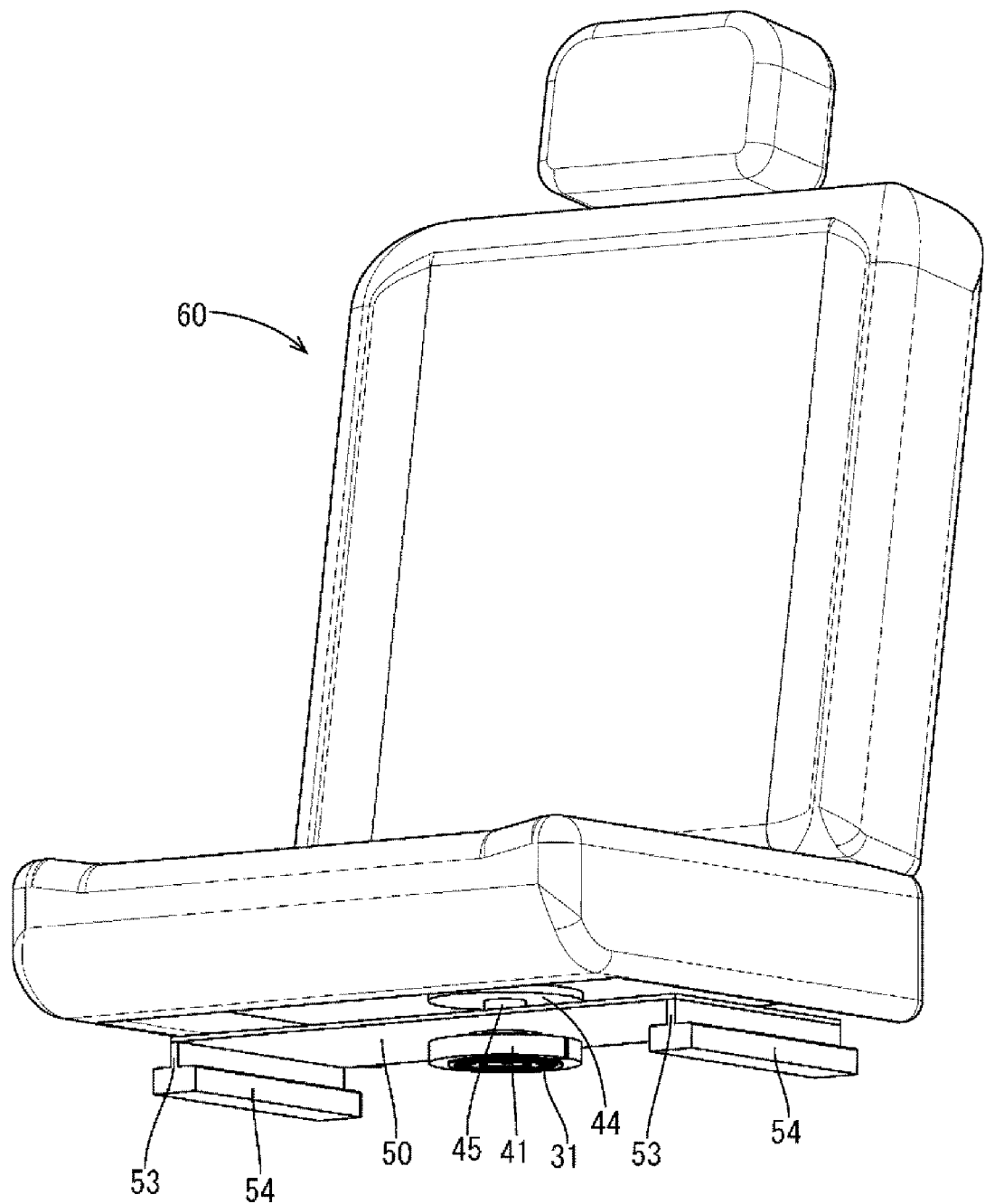
FIG. 10 is a perspective view showing the seat with a rotation shaft portion and a shield cover attached thereto.
Figure 11:
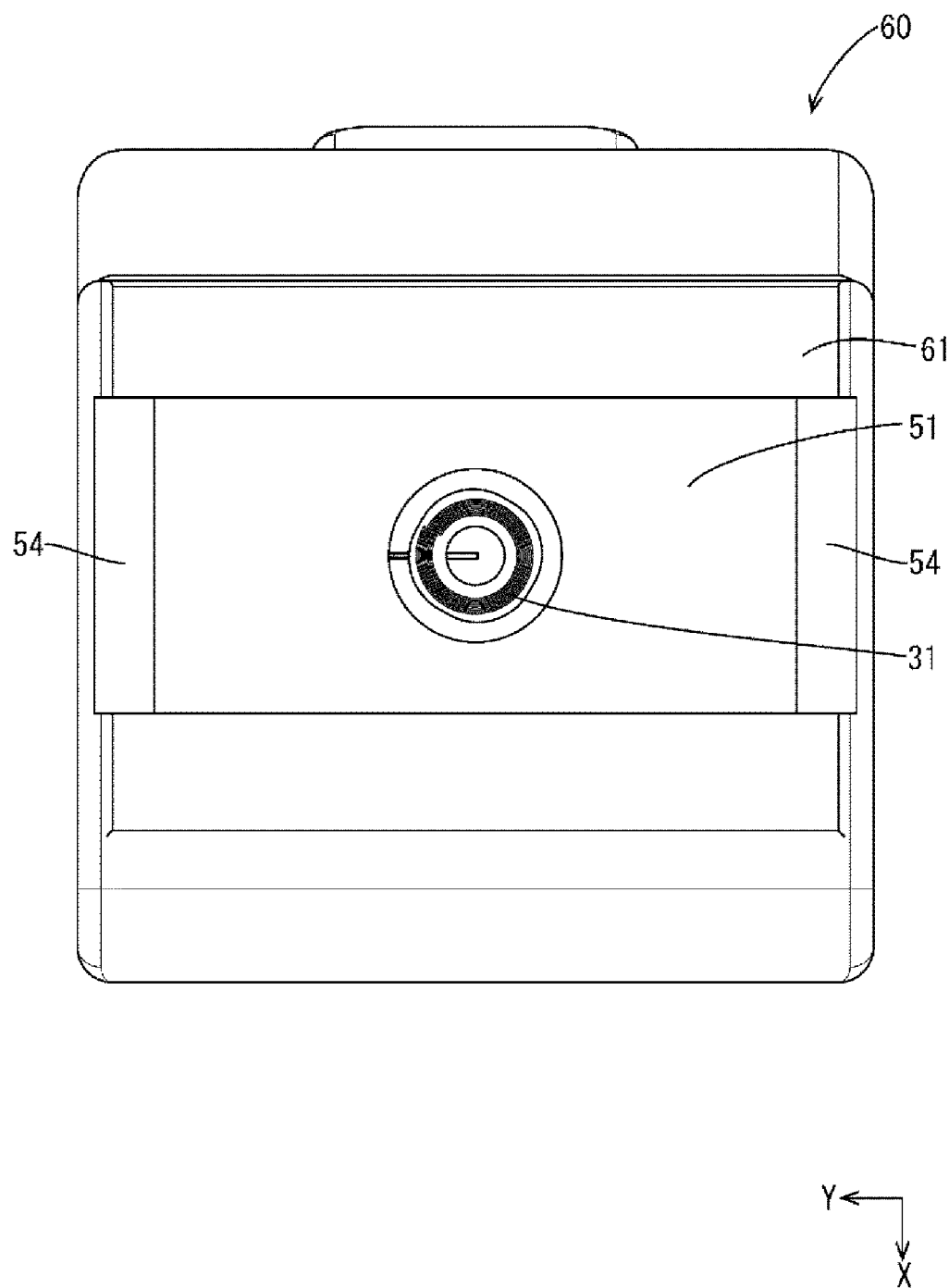
FIG. 11 is a bottom view showing the seat with the rotation shaft portion and the shield cover attached thereto.

As shown in FIGS. 7 and 8, the power transmission unit 20 is fixed to the top of the protruding portion 13 of the floor portion 11, and includes the plurality of power transmission coils 21 and power supply line extension portions 23, which extend from the power transmission coils 21 along the direction in which the power transmission coils 21 are lined up. The plurality of power transmission coils 21 are lined up in the longitudinal direction at regular intervals, and the power transmission coils 21 are constituted by coil bodies 21A in which cables are wound into a spiral shape, and coil holding portions 22 that may be made from a magnetic material such as ferrite, a synthetic resin, or the like, and hold the power transmission coils 21 in its spiral shape. The cables may be copper wires that are coated with an insulating layer, such as a layer of enamel. The power transmission coils 21 can be fixed to the upper surface of the floor portion 11 with a known means of attachment, such as bolting or welding. The power supply line extension portions 23 that extend from the power transmission coils 21 are arranged parallel to each other in the left-right direction. The power supply line extension portions 23 are connected to an apparatus such as an ECU (Electronic Control Unit) via power lines that are disposed under the floor or over the floor (and under a mat, panel, or the like) of an automotive body.

(Power Reception Unit 30)

Figure 13:
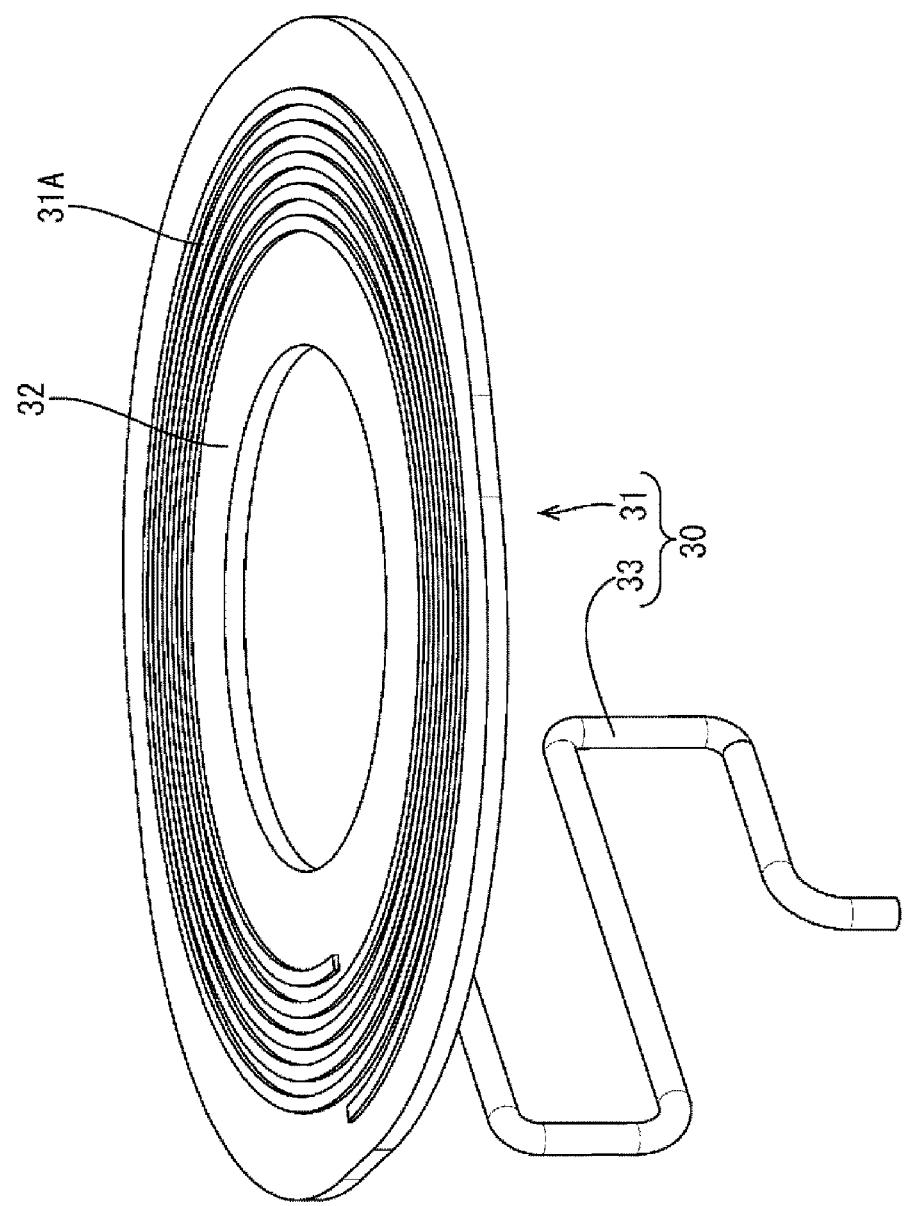
FIG. 13 is a perspective view showing a power reception unit.

As shown in FIG. 13, the power reception unit 30 includes the power reception coil 31, and a power reception line extension portion 33 that extends from the power reception coil 31 towards the seat 60. The power reception coil 31 can be constituted by a coil body 31A in which a cable is wound into a spiral shape, and the coil holding portion 32 made from a magnetic material such as ferrite, a synthetic resin, or the like holds the shape of the coil body 31A in its spiral shape. The cable may be a copper wire that is coated with an insulating layer, such as a layer of enamel. The power reception line extension portion 33 is connected to an electrical component of the seat 60.

(Rotation Shaft Portion 40)

Figure 12:
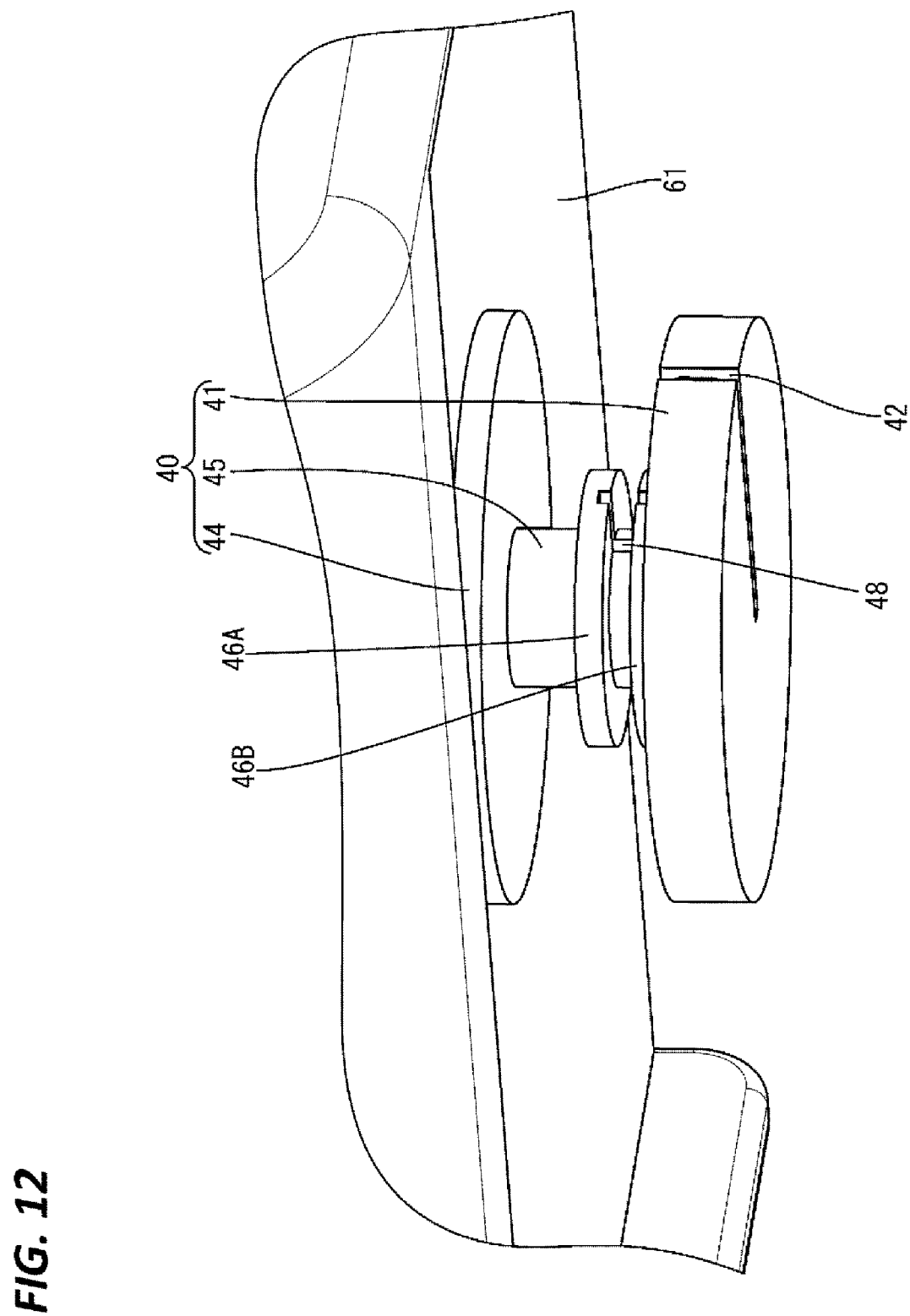
FIG. 12 is a perspective view showing an enlarged portion of the rotation shaft portion in FIG. 10 in a state in which the shield cover has been removed.

The rotation shaft portion 40 may be made from a synthetic resin or a metal for example, and, as shown in FIGS. 3 and 12, includes a coil fixing portion 41 to which the power reception coil 31 is to be fixed, a seat fixing portion 44 that is fixed to the bottom surface of the seat 60, and a column portion 45 that couples the coil fixing portion 41 and the seat fixing portion 44 to each other. The coil fixing portion 41 has a disc-shape with a uniform thickness, and at least the bottom surface thereof is bigger than the power reception coil 31, and is provided with a slit-shaped cable insertion groove 42 into which the power reception line extension portion 33 is inserted that is continuous with the power reception coil 31. The power reception coil 31 can be fixed to the bottom surface of the coil fixing portion 41 with any of various means of fixation, such as bolting or welding.

The seat fixing portion 44 has a disc-shape with a uniform thickness, and is fixed to the bottom end portion of the seat 60 with a means of fixation such as bolting and the like. Note that the seat fixing portion 44 is not limited to being separate from the seat 60, and may also be formed in one piece with the seat 60. The column portion 45 has a round columnar shape whose center axis extends in the vertical direction, and is formed in one piece with the coil fixing portion 41 and the seat fixing portion 44. The center axis of the column portion 45 is coaxially arranged with the coil fixing portion 41 and the seat fixing portion 44. Here, the center axis of the column portion 45 (the center axis of the rotation shaft portion 40) is coaxially arranged with the center of the power reception coil 31. The column portion 45 is provided with a pair of protruding portions 46A and 46B that protrude radially in a plate-like shape, and the space between the pair of protruding portions 46A and 46B serves as a cover insertion groove portion 47 into which the shield cover 50 is inserted. The groove bottoms (the outer surface of the column portion 45) of the protruding portions 46A and 46B and the cover insertion groove portion 47 are provided with a through-groove 48 into which the cable extending from the power reception coil 31 is fitted. The shield cover 50 can be inserted into the cover insertion groove portion 47 by splitting the rotation shaft portion 40 between the protruding portions 46A and 46B, but the rotation shaft portion 40 may also be formed through insertion-molding in which the shield cover 50 is disposed in a mold.

(Shield Cover 50)

Figure 14:
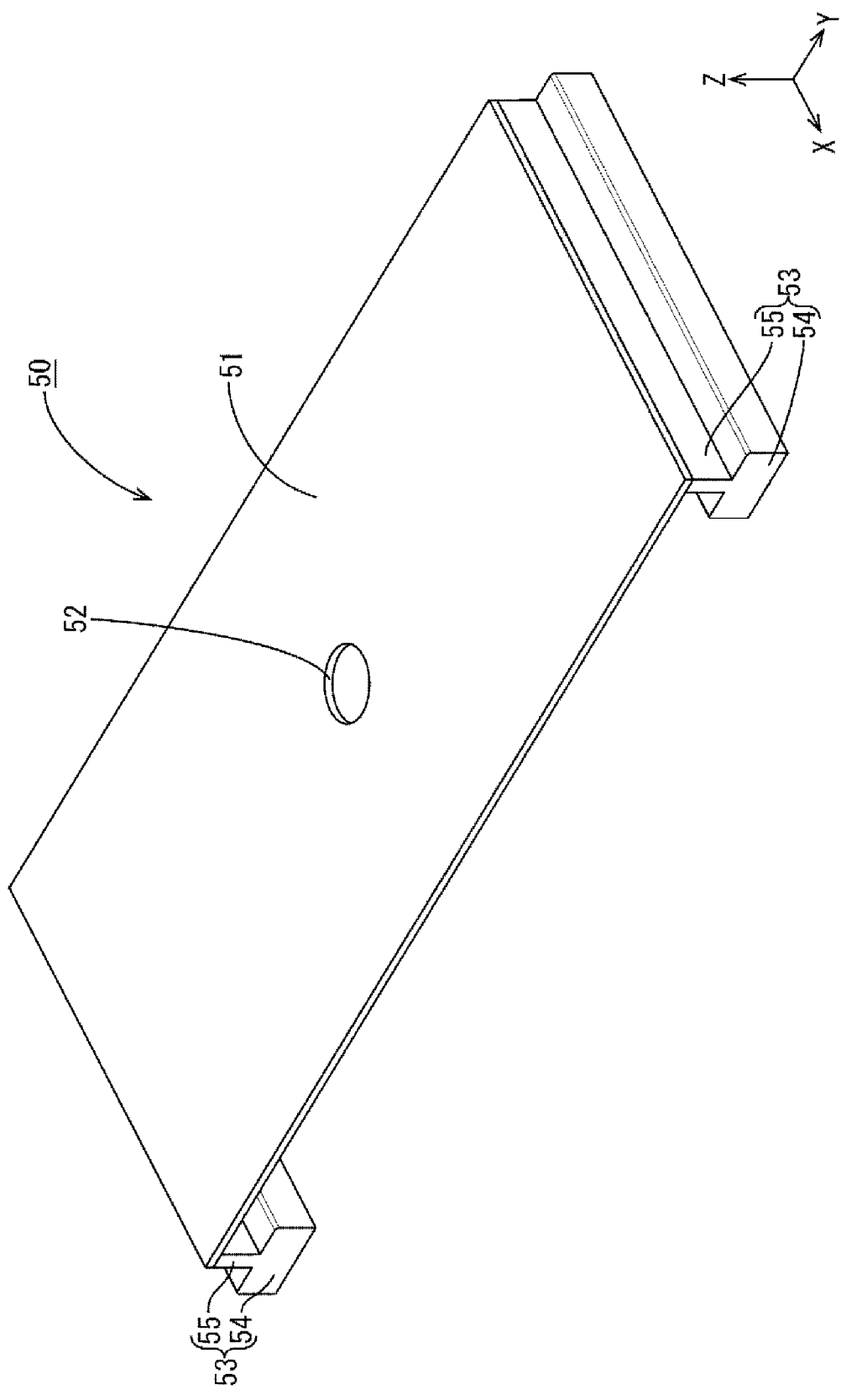
FIG. 14 is a perspective view showing the shield cover.

The shield cover 50 is made of a metal such as aluminum, and as shown in FIG. 14, includes a rectangular plate-shaped cover body 51, and leg portions 53 that are provided on the left and right hand sides of the cover body 51 and can be inserted into and slide in the rails 15. The middle portion of the cover body 51 has a round shaft insertion hole 52 formed passing therethrough into which the column portion 45 of the rotation shaft portion 40 can be inserted. The edge of the shaft insertion hole 52 is arranged between the protruding portions 46A and 46B of the column portion 45. Thus, the rotation shaft portion 40 inserted into the shield cover 50 can rotate relative to the shield cover 50, and therefore the seat 60 can be rotated relative to the automotive body. Note that in the present embodiment, the protruding portions 46A and 46B of the rotation shaft portion 40 (and, for example, the bottom surface of the seat 60) are supported by the cover body 51 and thus the weight of the seat 60 is supported by the shield cover 50, but there is no limitation thereto and supporting portions that support the gravitational force of the seat 60 may also be provided separately. A configuration is also possible in which a rotating mechanism other than the rotation shaft portion 40 (and the shaft insertion hole 52) is provided to allow the seat 60 to rotate.

The leg portions 53 include the slide-insertion portions 54 that can be inserted in the through-holes 16 of the rails 15 and move along the inner wall of the rails 15 while maintaining contact thereto, and leg portions 55 that couple the cover body 51 to the slide-insertion portions 54. The slide-insertion portions 54 have a rectangular parallelepiped shape that is elongate in the longitudinal direction, and can move in the through-holes 16 in the longitudinal direction. The shield cover 50 slides relative to the rails 15 and therefore allows the seat 60 to slide, the seat 60 being coupled to the shield cover 50 via the rotation shaft portion 40. Note that in the present embodiment, although not shown in the drawings, a moving mechanism is included for holding the position of the seat 60 in the longitudinal direction thereof to positions at which the power transmission coils 21 are coaxial with the power reception coil 31. The moving mechanism may be, for example, provided with a stopping means for stopping the seat 60 at regular intervals relative to the positions of the power transmission coils 21, provided with a sensor and an electronic sliding apparatus that detects the position of the seat 60, and the electronic sliding apparatus may enable the seat 60 to slide to positions at which power can be supplied from the power transmission coils 21 to the power reception coil 31.

The following describes how power is supplied when the seat 60 rotates.

Figure 6:
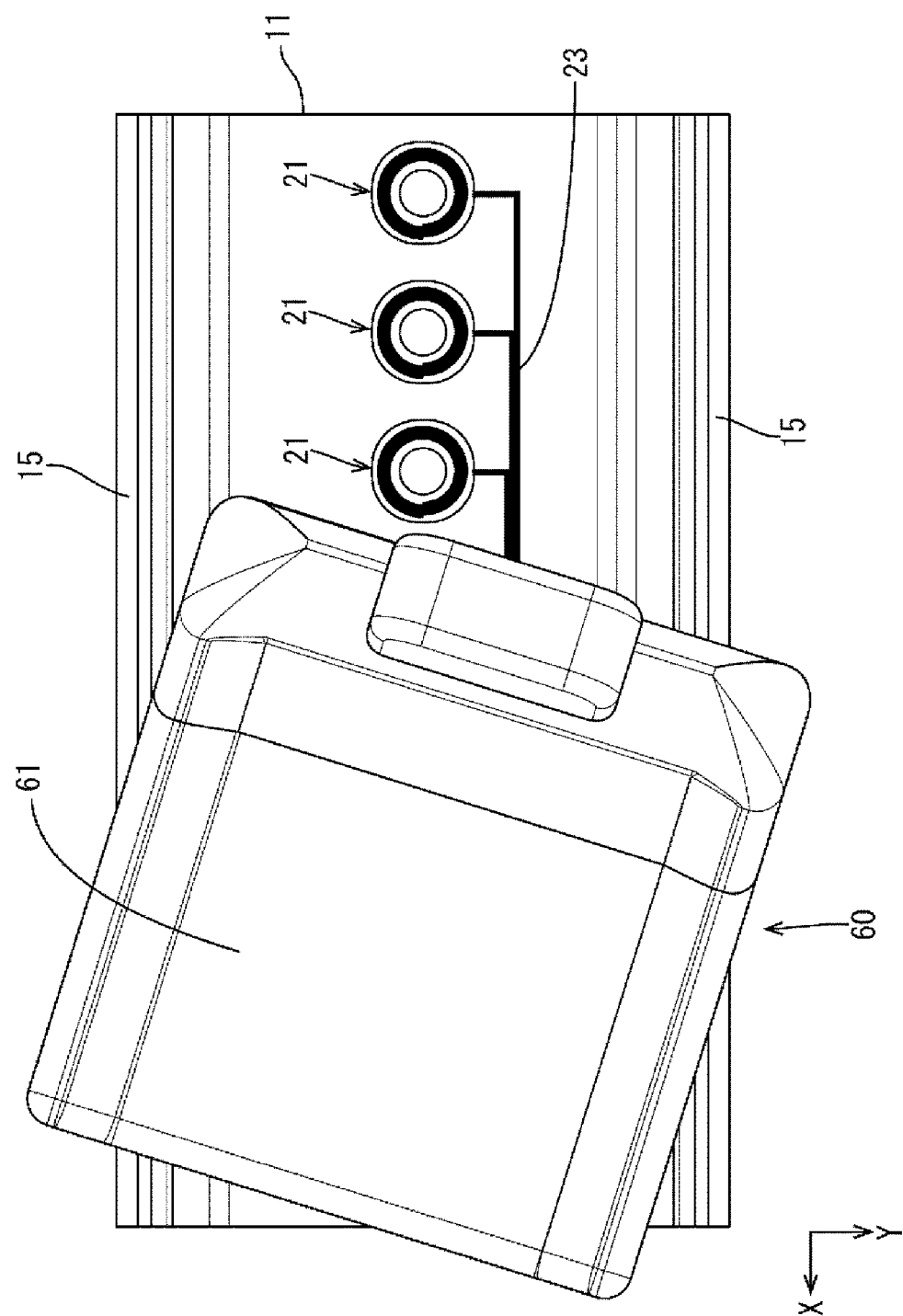
FIG. 6 is a plan view showing a state in which the seat has been rotated.

If the seat 60 is slidably moved by a user operating an operating means such as a slide-switch to drive a motor that rotates the seat 60, or if the seat 60 is manually rotated by the user, one of the power transmission coils 21 will be arranged opposite to the power reception coil 31 at a position that allows power to be supplied thereto. In this state, as shown in FIG. 6, if the seat 60 is rotated about the center of the rotation shaft portion 40 by a user operating an operating means such as a rotate-switch to drive a motor that rotates the seat 60, or if the seat 60 is manually rotated by the user, the power reception coil 31 also rotates but is held in a state in which one of the power transmission coils 21 opposes the power reception coil 31, and therefore power can continue to be supplied from the power transmission coil 21 to the power reception coil 31.

The action and effects of the present embodiment will be described next.

The power supply device 10 for a seat that can slidably move relative to the rail 15 that is provided in the floor portion 11 of an automotive body, the power supply device 10 including: the power transmission unit 20 that is provided in the floor portion 11; the rotation shaft portion 40 that is fixed to the seat, and serves as the rotation axis of the seat; and the power reception unit 30 that is fixed to the rotation shaft portion 40 and is configured to receive power from the power transmission unit 20.

With this embodiment, the power reception unit 30 is fixed to a rotation shaft portion 40 that serves as the rotation shaft of the seat 60, and therefore it is possible to hold the power reception unit 30 at a position at which power can be supplied from the power transmission unit 20, even if the seat 60 is rotated. Accordingly, it is possible to continue to supply power from the power transmission unit 20 to the power reception unit 30 when the seat 60 is rotated.

Also the power transmission unit 20 includes a plurality of the power transmission coils 21, and the plurality of power transmission coils 21 are arranged next to each other along the sliding direction of the seat 60 in the floor portion 11.

In this way, it is possible to change the power transmission coil 21 that transmits power to the power reception coil 31 in accordance with the sliding of the seat 60.

Also, the center of the power reception coil 31 and the center of the rotation shaft portion 40 are arranged coaxially.

In this way, if the seat 60 is rotated in a state in which the power reception coil 31 is arranged at a position at which the power reception coils 31 can receive power from the power transmission coils 21, it is possible to suppress positional misalignment of the power reception coil 31 relative to the power transmission coils 21, and therefore it becomes possible to more reliably continue to supply power from the power transmission unit 20 to the power reception unit 30.

Also, a metal shield cover 50 is included that is configured to cover the power transmission unit 20 and the power reception unit 30, and an insertion hole 52 into which the rotation shaft portion 40 is inserted is formed passing through the shield cover 50.

In this way, it is possible to reduce electro-magnetic noise from the power transmission coils 21 and the power reception coil 31 due to the shield cover 50.

The shield cover 50 includes a leg portion 53 that is slidably inserted into the rail 15.

In this way, it is possible to hold the shield cover 50 with the leg portions 53.

Other Embodiments

The technique disclosed in the present specification is not limited to the above embodiments described with reference to the drawings, and, for example, the following embodiments are also included within the technical scope of the technique disclosed in the present specification.

(1) In the embodiment described above, the power transmission unit 20 and the power reception unit 30 include the power transmission coils 21 and the power reception coil 31 respectively, but there is no limitation thereto and a configuration is also possible in which, for example, another known method of contactlessly transmitting and receiving power, such as a capacitor, is used for the power transmission unit and the power reception unit.

(2) The number of power transmission coils 21 is not limited to the number thereof described in the embodiments above, and any number of power transmission coils 21 may be included. For example, the power transmission unit 20 may also include only one of the power transmission coils 21. Also, the embodiment described above includes one power reception coil 31, but there is no limitation thereto, and a configuration is also possible in which a plurality of power reception coil 31 are included.

(3) In the embodiment described above, the rotation shaft portion 40 is coaxial with the center of the power reception coil 31, but there is no limitation thereto, and a configuration is also possible in which the center axis of the rotation shaft portion 40 is away from the center of the power reception coil 31 but within an area in which power can still be supplied to the seat 60 when the seat 60 rotates.

(4) The embodiment described above includes the shield cover 50, but there is no limitation thereto, and a configuration is also possible in which the shield cover 50 is not included. In this case, for example, a member may also be provided in place of the shield cover that can enable the seat 60 to slide.

LIST OF REFERENCE NUMERALS

10: Power supply device
11: Floor portion
15: Rail
20 Power transmission unit
21: Power transmission coil
30: Power reception unit
31: Power reception coil
40: Rotation shaft portion
41: Coil fixing portion
42: Cable insertion groove
44: Seat fixing portion
45: Column portion
46A, 46B: Protruding portion
47: Cover insertion groove portion
50: Shield cover
52: Shaft insertion hole
53: Leg portion
54: Slide-insertion portions
60 Seat

What is claimed is:

1. A power supply device comprising:
a power transmitter that is provided in a floor portion of an automotive body;
a rotation shaft that is fixed to a seat configured to slidably move relative to a rail that is provided in the floor portion of the automotive body, and serves as a rotation axis of the seat;
a power receiver that is fixed to the rotation shaft and is configured to receive power from the power transmitter;
a metal shield cover configured to cover the power transmitter and the power receiver; and
an insertion hole provided in the metal shield cover and into which the rotation shaft is inserted,
wherein the rotation shaft includes a coil fixing plate to which the power receiver is fixed, a seat fixing plate that is fixed to a bottom surface of the seat, and a column that couples the coil fixing plate and the seat fixing plate to each other, and
the column of the rotation shaft is provided with a pair of projections that protrude radially in a plate-like shape and have a cover insertion groove into which the metal shield cover is inserted, therebetween.

2. The power supply device according to claim 1, wherein the power transmitter includes a power transmission coil, and
the power receiver includes a power reception coil that receives power from the power transmission coil.

3. The power supply device according to claim 2, wherein a center of the power reception coil and an axial center of the rotation shaft portion are arranged coaxially.

4. The power supply device according to claim 1, wherein the power transmitter includes a plurality of the power transmission coils, and
the plurality of power transmission coils are arranged next to each other along a sliding direction of the seat in the floor portion.

5. The power supply device according to claim 1, wherein the metal shield cover includes a leg that is slidably inserted into the rail.

6. The power supply device according to claim 1, wherein the coil fixing plate is provided with a slit-shaped cable insertion groove into which a power reception line extension portion, which is continuous with the power receiver, is inserted.

7. The power supply device according to claim 1, wherein an outer surface of the column is provided with a through-groove into which a cable extending from the power receiver is fitted.

8. The power supply device according to claim 1, wherein an edge of the insertion hole is arranged in the cover insertion groove between the pair of projections of the column.

* * * * *